United States Patent [19]
Blount

[11] Patent Number: 4,997,297
[45] Date of Patent: Mar. 5, 1991

[54] CRYOGENIC ANTI-FRICTION BEARING WITH REINFORCED INNER RACE

[75] Inventor: Dale H. Blount, Huntsville, Ala.

[73] Assignee: The United States of America as represented by the Administrator of the National Aeronautics and Space Administration, Washington, D.C.

[21] Appl. No.: 430,640

[22] Filed: Jan. 31, 1990

[51] Int. Cl.⁵ ............ F16C 33/64; F16C 43/04; F16C 37/00
[52] U.S. Cl. .................. 384/585; 384/476; 384/557; 384/561
[58] Field of Search ............ 384/476, 492, 493, 513, 384/515, 516, 537–542, 548, 557, 559–561, 564, 569, 584, 585

[56] References Cited

U.S. PATENT DOCUMENTS

Re. 26,591  5/1969  Kay ............... 384/585
3,276,282  10/1966  Mansfield ......... 384/585
3,304,140  2/1967  Hornigold ......... 384/537
3,771,845  11/1973  Strickler ......... 384/540

Primary Examiner—Thomas R. Hannon
Attorney, Agent, or Firm—William J. Sheehan; Jerry L. Seemann; John R. Manning

[57] ABSTRACT

This invention consists of a bearing (26) designed to operate in a cryogenic environment and which has an inner raceway (30) generally constructed as an annular band fitted by an interference fit to a rotating shaft (12). A pair of annular tension bands (32, 34) are fitted onto opposed sides of the band and function to firmly clamp the raceway (30) to the shaft (12). This occurs because the tension bands are constructed of a material which, when cooled to aproximately −385° F., shrinks more than the raceway (30) and the shaft (12) to which it is fitted. The bands further relax somewhat at room temperature and permit the interference fit between the raceway (30) and the shaft (12) to be sized such that the raceway (30) is not overly stessed.

13 Claims, 1 Drawing Sheet

CRYOGENIC ANTI-FRICTION BEARING WITH REINFORCED INNER RACE

ORIGIN OF THE INVENTION

The invention described herein was made by an employee of the United States Government and may be manufactured and used by or for the Government for Government purposes without the payment of any royalties thereon or therefor.

FIELD OF THE INVENTION

This invention relates generally to anti-friction bearings, and more particularly to a bearing used in cryogenic applications wherein the inner race is restrained on a rotating shaft by a combination of interference fit between the shaft and inner race and a pair of tension bands/guideways having a coefficient of thermal shrinkage such that the bands shrink more than the inner race and shaft when cooled and tightly hold the inner race in place at cryogenic operating temperatures and high rotational speed.

BACKGROUND OF THE INVENTION

In the past, traditional methods for fixing anti-friction bearing races into openings or onto shafts have been rather limited, the most preferred and widely used being an interference fit in which the mating portion of a bearing race is sized slightly smaller or larger than the respective shaft or opening it is designed to fit. Of course, the degree of "interference" between the bearing race and its shaft or opening and the materials thereof dictates the method used to get the race into place. A small degree of interference facilitates a press fit wherein the race may be evenly pressed into place by a machine press, while a greater degree of interference usually necessitates heating material around an opening or cooling a shaft to take advantage of thermal expansion or shrinkage to enlarge or reduce an opening or shaft into/onto which a race is to be fitted. Also, the bearing may be cooled or heated to some extent to increase the effect. One particular example of this is in the automotive engine refurbishing industry wherein when valve seats of cylinder heads deteriorate or become damaged, it is most preferable, if the cylinder head is fabricated from aluminum, to replace them by placing the head in a suitable oven and heating the head. The coefficient of thermal expansion is greater for the aluminum alloy head than the hardened steel alloy of the valve seats, and upon reaching a selected temperature in excess of engine operating temperature, the valve seats may be removed with little or no applied force. Naturally, the degree of interference between the valve seats and their openings in the head is selected to tightly hold the valve seats in the head at engine operating temperature (180° to 220° F.) but yet become loose in the oven (approximately 500° F.). After removing the damaged seats, one quickly puts the new seats in after reheating the head, with the seats being at room temperature, or the seats may be cooled in a freezer (approximately 0° F.) to further shrink their diameters and facilitate convenient installation.

The interference fit technique and methods for assembly work well enough in automotive and other industries, but for specialized application such as high-speed cryogenic pumps found in rocket motors, problems arise. Particularly, in an upper main roller bearing assembly of the Space Shuttle Main Engine (SSME) Alternate Turbopump Design (ATD) of the fuel turbopumps, difficulty was experienced with the inner race of the bearing occasionally cracking after a short period of time. The race, constructed of 440C steel hardened to an Rc (Rockwell C) of 56 to 62, possesses a coefficient of thermal expansion of $4.05 \times 10^{-6}$ in/in of averaged over a temperature range of $+70°$ to $-400°$ F., while the shaft, constructed of Inconel TM 718 or IN100, possesses a coefficient of thermal expansion of $4.8 \times 10^{-6}$, likewise averaged. 440C is used for the race because it can be hardened to the desired hardness, has excellent general corrosion and rust resistance, which is important because only small amounts of dry film transfer lubricant are used in the bearing, and it must tolerate long storage times unprotected by lubricant film. Further, 440C is not subject to hydrogen embrittlement, important because of the hydrogen-rich environment around the bearing when in use. While it is believed there are other materials that may perform adequately, 440C appears to be the optimum design choice for the above-stated reasons.

Bearing in mind that these components are subjected, when in operation, to extremely cold temperatures of approximately $-400°$ F., followed by a return to ambient temperature, calculations show that, given a shaft size of $2.8739'' \pm 0.0001''$, the difference in contraction between the shaft and the opening in the race due to the differences in coefficients of thermal expansion will cause a reduction in diameter of the shaft 0.0010'' more than the reduction of the opening in the race, loosening the interference fit. Further, centrifugal growth of the race at operating speed (approximately 37,341 rpm) causes the opening in the race to expand an additional 0.0028'' more than the shaft, further loosening the fit. From this, it is seen that in order to have a tight fit of the inner race on the shaft at cryogenic operating temperatures, the opening in the race must be undersized by approximately 0.004'' at room temperature, with 0.005'' being considered the minimum acceptable and providing 0.001'' interference at cryogenic operating temperature and operating speed.

At least this degree of interference (0.001'') is required to prevent occasional slippage between the race and shaft, causing the race to "creep" around the shaft, resulting in galling and other damage thereto. Worse yet, at room temperature, tensile stresses in the race, on the order of 48,100 PSI at 0.005'' interference, promotes stress corrosion cracking over the storage times typical for rocket motors and their components, which could result in a cracked race. This problem was manifested during assembly of the race to the shaft wherein, when the shaft was cooled in liquid nitrogen to reduce its diameter, and the race was heated to expand its diameter so that the race could be easily positioned on the shaft, the race would occasionally crack as room temperature equilibration occurred between assembled shaft and race.

Responsive to this problem, the manufacturing of the race developed to a point where meticulous and expensive fabrication techniques to largely eliminate stress concentration points at a microscopic level were required in order to produce a sufficiently durable race at the aforestated stress levels. With the bearing ground and polished to perfection, the fit was sized at what was believed to be a best-obtainable balance between overstressing the race at room temperature on one hand and not having a tight enough fit at cryogenic operating temperature on the other. These efforts, however, are obviously expensive and time-consuming and demonstrate the need for a robust bearing race for the described purpose that is not so difficult to manufacture and assemble.

Attempts by others to overcome problems relating to anti-friction bearing races becoming loose owing to different thermal expansions are not directed to similar problems encountered in a cryogenic environment. Pertinently, U.S. Pat. No. 4,283,096, issued Aug. 11, 1981, to Picard et al., discloses an anti-friction bearing having an outer race restrained from thermal and centrifugal growth by a ring disposed thereabout and having a modulus of elasticity higher than, and a coefficient of expansion lower than, the outer race. However, the application of Picard et al. is directed toward turbine engines and does not address the problem of an inner race becoming loose on a pump shaft due to different degrees of shrinkage from extreme cold. Further, in the restrained outer race of Picard et al., the ring which restrains the race is not a part of the bearing itself but an additional component.

It is, therefore, an object of the present invention to provide an inner race for an antifriction bearing that will not loosen at cryogenic temperatures and is not under such high tensile stress at ambient temperature that will promote stress corrosion cracking.

SUMMARY OF THE INVENTION

In accordance with this invention, an anti-friction bearing for cryogenic operation in a pump is provided with an inner race disposed to fit a shaft of the pump. The inner race is constructed of a raceway member which is less stressed at ambient temperature due to a lesser degree of interference between itself and the shaft of the pump and is further provided with tension guideway bands or flanges constructed of a material having a coefficient of thermal expansion such that they function to firmly clamp the raceway to the shaft at cryogenic temperatures and high rotational speed.

BRIEF DESCRIPTION OF THE DRAWINGS

In FIGS. 2, 3, and 4, cylindrical rolling members 18 have been reduced in size and adjacent components not shown for convenience of illustration.

DESCRIPTION OF THE PREFERRED EMBODIMENT

Figure 1:
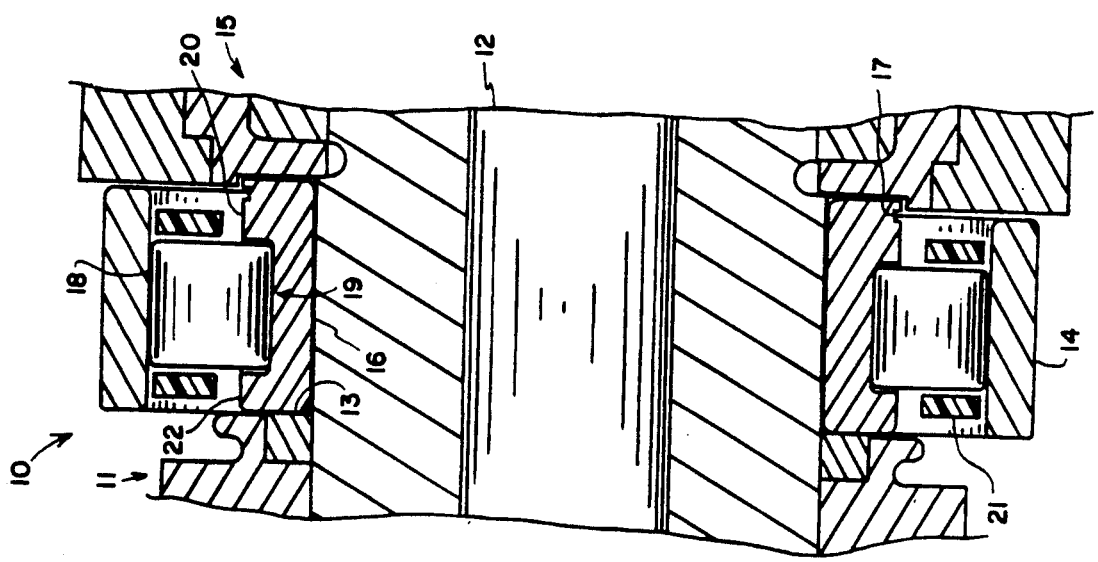
FIG. 1 is a cut-away view of an anti-friction bearing in the SSME Alternate Turbopump Design and being representative of the prior art.

Referring to FIG. 1, an anti-friction bearing 10 of the prior art is shown, the bearing being used in the Space Shuttle Main Engine (SSME) Alternate Turbopump Design (ATD) fuel turbopump manufactured by the Pratt & Whitney Corporation. Bearing 10 is shown cut-away and fitted to a hollow shaft 12 of the turbopump. Throughout operation, shaft 12 runs at approximately 37,300 rpm, with bearing 10 rotating in a liquid hydrogen environment at −385° F. Bearing 10 consists of an inner race 16 which, when assembled to shaft 12, abuts against an axial spring 13 (diagrammatically shown) and which is held in place by an adjacent seal 11. The seal 11 in turn abuts against a shoulder machined into shaft 12 (not shown). Another structural member 15 is abutted against the opposite side of race 16, with these "stacked" components held in place by a nut on the end of shaft 12 (not shown). A plurality of rolling members 18 roll in a raceway portion 19 of raceway 16, with guideway flanges 20 and 22 on opposite sides of race 16. Flanges 20 and 22 serve to axially hold rolling members 18 in place during transient axial motion of shaft 12 during operation. A groove 17 is provided in flange 20 into which a pulling tool (not shown) is fitted for pulling race 16 from shaft 12. A cage 21 generally constructed of a material such as Armalon TM, a fiberglass material filled with Teflon TM, keeps rolling members 18 in spaced relation and provides small amounts of dry film transfer lubricant to bearing 10. Outer race 14 has an inside diameter sized such that during assembly it is necessary to heat race 14 to expand its diameter prior to installing it over rolling members 18, with outer race 14 shrinking as it cools onto rolling members 18. This slightly crowns outer race 14 onto rolling members 18 and imparts preload to bearing 10.

Materials and selected properties thereof used to manufacture bearing 10 and shaft 12 are discussed in the *Materials Properties Manual* published by Rockwell International, fourth edition, Revision A, dated Jun. 30, 1988, and other standard properties manuals, and are as follows.

Shaft 12 is constructed of Inconel# 718 or IN100, which, as stated, has a coefficient of thermal expansion of approximately $4.80 \times 10^{-6}$ in./in.° F. averaged over a temperature range of +70° to −400° F. Inconel 718 has a similar coefficient of expansion. The outside diameter of shaft 12 where bearing 10 is fitted is 2.8739"±0.0001".

Inner race 16 is constructed of 440C, a ferrousbased alloy having a coeffient of thermal expansion of $4.05 \times 10^{-6}$, likewise averaged, and has a maximum inside diameter of 2.8689".

Rolling members 18 are constructed of 440C, and the outer race is constructed of 9310. Tolerances of these components are not germain to applicant's invention.

From an examination of the relative tolerances between shaft 12 (2.8739") and the inside diameter of inner race 16 (2.8689"), it is seen that the inside diameter of race 16 is sized at a minimum of 0.005" less than outside diameter of shaft 12 at room temperature. This is to compensate for the differing coefficients of thermal expansion between the materials of shaft 12 and race 16, which causes shaft 12 to shrink 0.0010" more than race 16 at operating temperature, loosening race 16 on shaft 12. Centrifugal growth of race 16 at operating rpm further loosens race 16 by another 0.0028", meaning that a minimum of 0.004" interference is necessary at room temperature in order to achieve a minimal interference fit at operating temperature, with 0.005" providing the required tighter fit having approximately 2,000 PSI contact pressure between race 16 and shaft 12 at operating temperature. However, this degree of interference, at room temperature, creates hoop stresses of approximately 48,100 PSI in race 16, which exceeds the limit of 25,000 PSI for stress corrosion cracking of the 440C it is constructed of.

To overcome the problems of the inner race 16 becoming too loose on shaft 12 at operating temperature and speed and being under such high tensile stress at room temperature that stress corrosion cracking occurs, applicant provides a bearing 26 (FIG. 2) with an inner race 28 having an annular raceway member 30 which is fitted to shaft 12 and sized with an inside diameter greater than the race of the prior art, providing a lesser degree of interference with shaft 12 and correspondingly less stress in raceway 30 at room temperature. As shown, guideway flanges are constructed as tension bands 32 and 34 positioned on opposite sides of raceway 30 and function to reinforce the interference fit between shaft 12 and member 30 when chilled to the temperature of liquid hydrogen ($-385°$ F.). Raceway 30 is constructed of 440C, with opening 31 having an inside diameter of only 0.0022" less than the outside diameter of shaft 12. With this degree of interference at room temperature, the 440C of raceway member 30 is subjected to approximately 18,500 PSI hoop stress, well below the maximum limit of 25,000 PSI, above which stress corrosion cracking occurs.

Tension bands 32 and 34 are constructed of a material such as Waspaloy TM or similar material which, like 440C, is not subject to hydrogen embrittlement, is strong, yet unlike 440C, is not subject to stress corrosion cracking and has a high fracture toughness. More importantly, Waspaloy has a coefficient of thermal expansion of $5.74 \times 10^{-6}$, averaged as described, which exceeds the coefficient of expansion of shaft and raceway member 30. Waspaloy bands 32 and 34 are sized 0.0086" less than grooves 40 and 42 of raceway 30 into which bands 32 and 34 fit, with grooves 40 and 42 having shoulders 41 and 43, respectively, against which bands 32 and 34 are abutted during assembly. This degree of interference, at room temperature, generates approximately 94,200 PSI tension in the bands, which increases to approximately 125,000 PSI at operating temperature ($-385°$ F.) and speed (37,341 rpm) as the bands clamp raceway 30 to shaft 12 with 2,000+ PSI contact pressure. However, as the allowable tensile stress limit for Waspaloy is above 155,000 PSI, it is seen that the tension bands are not significantly stressed. In effect, this allows tension band guideway flanges 32 and 34 to maintain a tight fit of the raceway 30 to shaft 12 at operating conditions, yet relax somewhat at room temperature, at which the interference fit between raceway 30 and shaft 12 is such that it does not generate stress corrosion in the 440C of the raceway.

It is to be emphasized that tension band guideway flanges 32 and 34 function as a part of bearing 26, with Waspaloy inner walls 36 and 38 hardened to Rc43-47, less than the inner walls of the 440C. This is advantageous in that the softer but tougher Waspaloy is not as likely to chip as the 440C when contacted by rollers 18 during the aforementioned transient axial loading of shaft 12.

Figure 3:
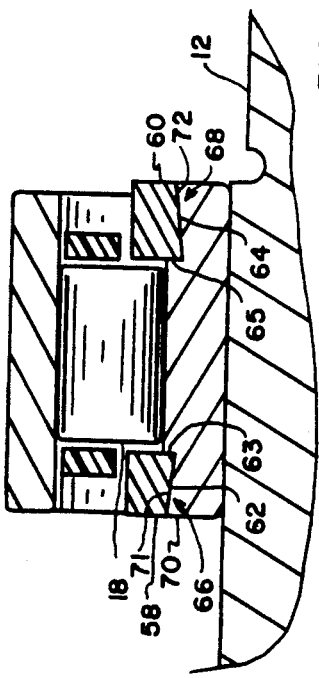
FIG. 3 is a cut-away view of an alternate embodiment of the present invention.

FIG. 3 illustrates an embodiment of the present invention wherein it is contemplated to use inwardly slanted bottom walls 62 and 64 and vertical walls 63 and 65 to form grooves 66 and 68 in raceway 70. Bottom surfaces 71 and 72 of guideway flange tension bands 58 and 60 are slanted to match slanted walls 62 and 64, with these slanted walls providing a wedging effect that maintains tension bands 58 and 60 in place. Of course, the slant of the walls must be selected such that the innermost portion of the tension bands will clear the outermost portion of the grooves during the shrink fit assembly.

Figure 4:
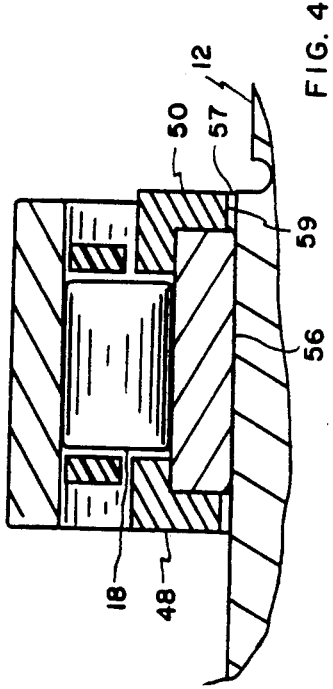
FIG. 4 is a cut-away view of another embodiment of the present invention.

FIG. 4 illustrates another embodiment of the present invention wherein annular tension bands 48 and 50 have an inverted L-shaped configuration which fits over the outer edges of raceway 56. A clearance region 57 prevents the downwardly extending portion 59 from abutting shaft 12 when cooled. In this embodiment, the tension bands are compressed on either side of raceway 56 by adjacent components (not shown), positively locking them in place. Further, raceway 56 is constructed as an annular band, eliminating the need for cutting or grinding a groove in each side of the raceway. This helps eliminates stress concentration points in raceway 56. As in the embodiment of FIG. 2, the L-shaped bands have inner surfaces which are parallel to shaft 12.

Figure 2:
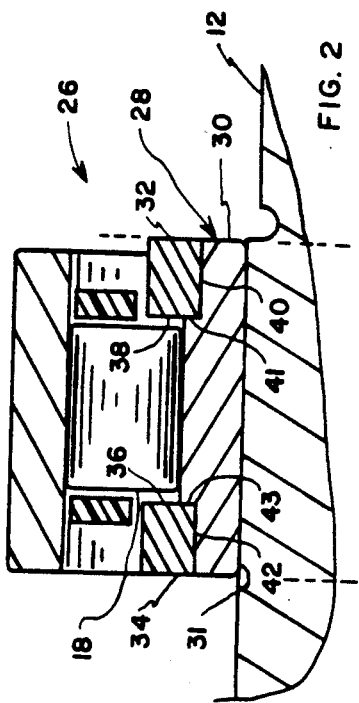
FIG. 2 is a cut-away view of an anti-friction bearing of the present invention.

It is to be further noted that in the embodiments of FIGS. 2 and 3, notches or grooves 40 and 42 and notches 62 and 64 provide shoulders to accurately position the tension bands during installation. In the embodiment of FIG. 4, the L-shaped configuration of bands 48 and 50 provide means to accurately position the bands on the raceway. Should it be required to use tension bands as shown in FIG. 2 along with a raceway member 56 without grooves (FIG. 4), the width of the bands may be sized such that they are accurately positioned when the outer edges thereon are aligned with outer edges of the raceway (dotted lines).

The contemplated method of installation of the inner raceway to shaft 12 also takes advantage of the respective coefficients of thermal expansion of the various components. For example, shaft 12 may be cooled to contract its diameter while one of raceways 30, 56, or 70 is heated to expand its internal diameter until the raceway can be slipped in place with little or no applied pressure thereto. Next, the assembly formed by shaft 12 and the raceway is cooled, and the guideway flanges are heated and slipped into place over the cooled raceway/shaft assembly. Alternately, the raceway may be cooled and the guideway flanges heated and slipped into place over the guideway, this assembly next being heated to expand it while shaft 12 is cooled to facilitate assembly therebetween.

Removal of the raceway member would first involve removing outer race 14 and rollers 18 and then using a pulling tool (not shown) to grip or engage a left edge of the raceway of FIGS. 2, 3, and 4. Force would then be applied to pull the raceway to the right until it is free of the shaft.

It is to be appreciated that while precise tolerances and specific materials have been set forth in the above example of the present invention, other materials and shrink tolerances may be used, in addition to other various incidental changes and modifications that may be resorted to and which fairly come within the scope of the appended following claims, in which I claim:

1. An anti-friction bearing having an outer race, an inner race assembly concentrically disposed in the outer race, and rolling members in rolling relation therebetween, said inner race assembly comprising:
    an annular raceway having an opening sized to provide an interference fit with a rotating shaft; and
    a pair of locking bands disposed in interference fit relation around top sides of said raceway, for applying compressive force to said raceway, thereby clamping the raceway to said shaft, and wherein said locking bands are constructed of a material having a coefficient of thermal expansion such that the locking bands contract more than said raceway as the inner race assembly is cooled.

2. An anti-friction bearing as set forth in claim 1 wherein said bands form guideway flanges for said bearing.

3. An anti-friction bearing as set forth in claim 2 wherein said bands are constructed of a substantially L-shaped configuration for fitting over outer edges of said raceway.

4. An anti-friction bearing as set forth in claim 1 wherein said locking bands are disposed in grooves on opposite sides of said raceway.

5. An anti-friction bearing as set forth in claim 4 wherein said bands are provided with inwardly sloped inner walls, and said grooves are provided with matching inwardly sloped lower walls for axially restraining said bands.

6. An anti-friction bearing as set forth in claim 4 wherein said inner walls of said bands are parallel to said shaft, and lower walls of said groove are parallel to said shaft.

7. An anti-friction bearing for a cryogenic turbopump shaft comprising:
   a circular, annular outer race having an inner periphery and a first bearing surface on said inner periphery; and
   a smaller, circular, annular inner race assembly concentrically disposed within said outer race and having an outer periphery with a second bearing surface thereon, said first and second bearing surfaces being in registry, and wherein said inner race assembly further comprises:
      a circular, annular raceway having an opening sized to provide an interference fit with the turbopump shaft, said raceway having said second bearing surface on said outer periphery thereof,
      a pair of locking bands circumferentially disposed in interference fit relation around opposed sides of said raceway and constructed of a material having a coefficient of thermal expansion such that the locking bands contract more than said raceway when cooled to cryogenic temperature, whereby said inner race is clamped to said shaft by combined forces of said interference fit and compressive forces of said locking bands, securing the interference fit between said shaft and said assembly, and
      a plurality of rolling members disposed between said first and second bearing surfaces.

8. An anti-friction bearing as set forth in claim 7 wherein edges of said bands provide guideway flanges for the bearing.

9. An anti-friction bearing as set forth in claim 8 wherein said bands are provided with inner surfaces being inwardly tapered and mating, inwardly sloped surfaces on said raceway for receiving said bands, providing axial restraint thereto.

10. An anti-friction bearing as set forth in claim 7 wherein inner surfaces of said bands are parallel with said shaft, and said raceway is also provided with parallel surfaces to said shaft for receiving said bands.

11. An anti-friction bearing as set forth in claim 7 wherein said bands are constructed of substantially L-shaped configuration for fitting over opposed outer edges of said raceway.

12. An anti-friction bearing as set forth in claim 7 wherein said raceway is constructed of 440C.

13. An anti-friction bearing as set forth in claim 7 wherein said locking bands are constructed of Waspaloy.

* * * * *

UNITED STATES PATENT AND TRADEMARK OFFICE
CERTIFICATE OF CORRECTION

PATENT NO. : 4,997,297
DATED : March 5, 1991
INVENTOR(S) : Dale H. Blount

It is certified that error appears in the above-identified patent and that said Letters Patent is hereby corrected as shown below:

On the title page:
Item bracket 21 "Appl. No.: 430,640" should read
- Appl. No.: 473,064 - .

Signed and Sealed this

Twenty-eighth Day of July, 1992

*Attest:*

DOUGLAS B. COMER

*Attesting Officer*      *Acting Commissioner of Patents and Trademarks*